Jan. 15, 1952     O. F. BAUER     2,582,408
GEAR TESTING MACHINE Filed Feb. 3, 1948     4 Sheets-Sheet 1

Inventor
OLIVER F. BAUER
Attorney

Inventor
OLIVER F. BAUER
Attorney

Jan. 15, 1952     O. F. BAUER     2,582,408
GEAR TESTING MACHINE Filed Feb. 3, 1948     4 Sheets-Sheet 3

FIG. 5

Inventor
OLIVER F. BAUER

By
Attorney

Jan. 15, 1952         O. F. BAUER         2,582,408

GEAR TESTING MACHINE

Filed Feb. 3, 1948         4 Sheets-Sheet 4

Inventor
OLIVER F. BAUER

By B. Schlesinger
Attorney

Patented Jan. 15, 1952

2,582,408

UNITED STATES PATENT OFFICE 2,582,408

GEAR TESTING MACHINE

Oliver F. Bauer, East Rochester, N. Y., assignor to Gleason Works, Rochester, N. Y., a corporation of New York Application February 3, 1948, Serial No. 6,005

12 Claims. (Cl. 51—26)

The present invention relates to machines for lapping and testing gears, and particularly to machines for lapping and testing spiral bevel and hypoid gears.

Gears are ordinarily provided with a slight amount of backlash to prevent binding when they run together. In testing gears, it is desirable that they be meshed in the position in which they have the desired amount of backlash. In lapping them it is desirable that the gears be run together in a postion which will develop the correct backlash.

Heretofore, in lapping or testing gears the operator has had to adjust the gears manually to the position of desired backlash. In a machine for testing or lapping spiral bevel or hypoid gears, this means adjusting the head, on which the pinion or smaller member of the pair is mounted, toward or from the head on which the gear, or larger member of the pair is mounted. In the interest of accurary the usual practice is to move the gears into mesh until their teeth engage without backlash, and then to withdraw the pinion head by rotating the handwheel, which is used in adjusting the head, the predetermined amount, measured by graduations on the handwheel, which is required to give the desired amount of backlash. These adjustments must be made for each pair of gears to be lapped or tested. Under mass production conditions, therefore, an operator loses a great deal of time in the course of a day just making his backlash settings. Moreover, since the required backlash in a pair of spiral bevel or hypoid gears is measured in a few thousandths of an inch, and since the amount of withdrawal of the pinion head, required for a given amount of backlash, varies with the pressure angle of the gears, there is always the possibility that the human factor involved in the adjustment may cause an error in the setting of the backlash.

A primary object of the present invention is to provide a machine for testing or lapping gears in which the required amount of backlash may be obtained automatically by a single simple machine adjustment.

Another object of the invention is to provide a machine of the character described in which adjustment of the amount of backlash for one pair of gears of a given ratio and pressure angle will serve for all pairs of gears of that design and separate adjustment for each pair of gears is obviated.

A further object of the invention is to provide a machine for testing or lapping gears in which the amount of backlash will be maintained constant automatically in the testing or lapping of successive pairs of gears as long as no change is made in backlash adjustment.

Other objects of the invention will be apparent hereinafter from the specification and from the recital of the appended claims.

Referring now to the drawings by numerals of reference, 20 denotes the base of the machine. On this base there are mounted as in conventional constructions the pinion or drive head 21 and the gear or driven head 22. The machine illustrated in the drawings is an improvement upon the machine disclosed in the Bullock et al. Patent No. 1,881,999, granted October 11, 1932, and the gear or driven head as well as other parts of the present machine, not specifically described hereinafter, may be identical in structure with corresponding parts of the machine disclosed in that patent.

The gear G, or larger member of the pair of gears which are to be tested or lapped, is adapted to be secured to a driven spindle (not shown) which is suitably journaled in the head 22. The pinion or smaller member P of the pair is adapted to be secured to a drive spindle 35 whose mounting will be described more particularly hereinafter.

Figure 2:
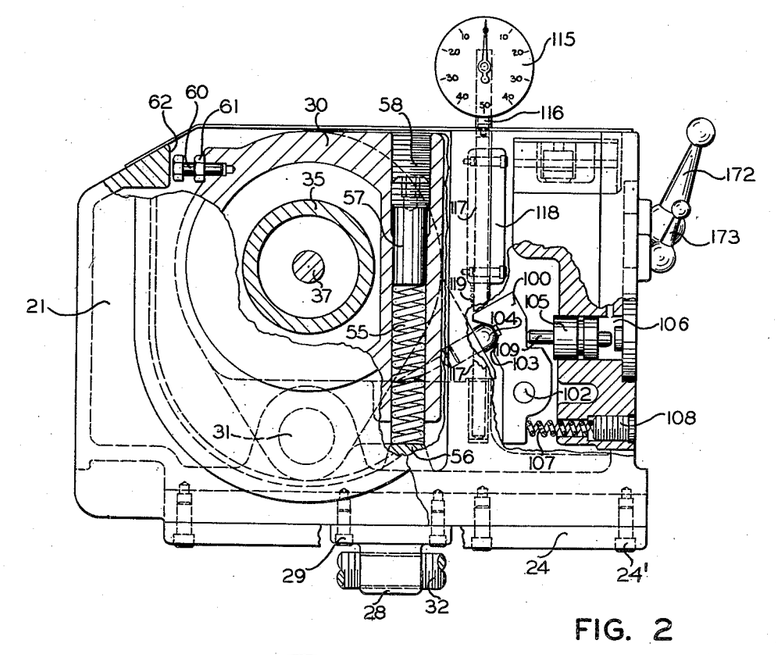
Fig. 2 is a front end elevation, with parts broken away, of the pinion or drive head of this machine.

The pinion or drive head 21 is adapted to slide rectilinearly on ways 23 on the base 20 to move the pinion P of the pair, which is to be lapped or tested, toward and from the gear G. The pinion head is held on these ways by gibs 24 which are secured to the head by screws 24'. Movement of the head 21 on the ways 23 is effected by reciprocation of a piston 25 (Fig. 8), which slides in a cylinder 26 and which has a piston rod 27 secured to or integral with it that projects through one end of the cylinder. The cylinder is adapted to be secured in the base of the machine and the piston rod is connected in any suitable manner with a screw shaft 32 that threads, as shown in Fig. 2, into a nut 28 which is secured by screws 29 to the drive head 21.

Oscillatably mounted in the head 21 is a cradle 30. This cradle is journaled on a pin 31 (Figs. 1, 2 and 3) which is secured in the head 21. Movement of the cradle on the pin also serves to move the pinion P toward or from the gear G and to control the depth of their meshing engagement.

Figure 1:
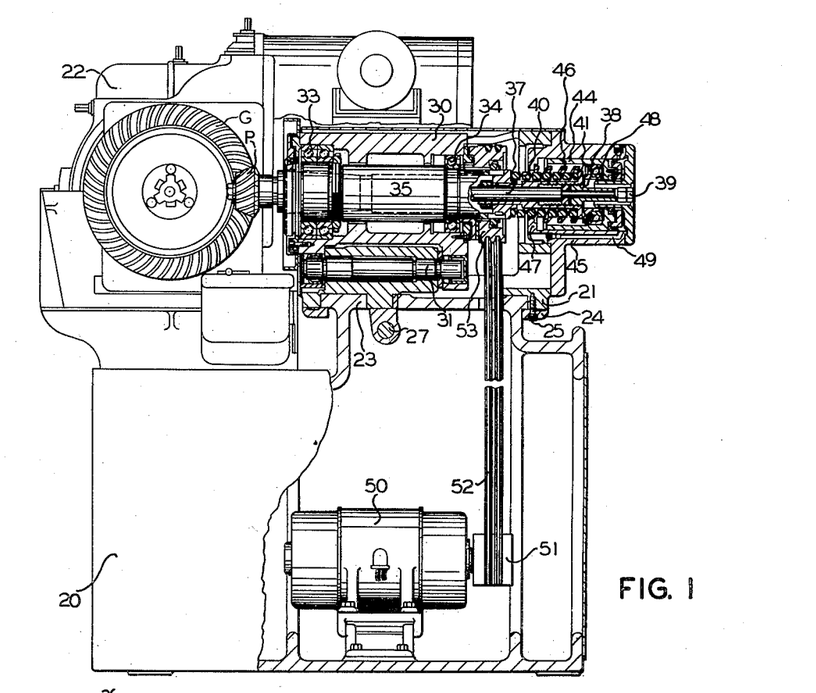
Fig. 1 is a side elevation, with parts broken away, of a combination lapping and testing machine built according to one embodiment of the present invention.

Journaled in the cradle 30 on anti-friction bearings 33 and 34 is the drive spindle 35. The pinion P is adapted to be secured to this spindle in any suitable manner as by means of a draw-bar 37 (Fig. 1). This draw-bar is mounted to slide in the spindle 35 and at its rear end in a sleeve 38, and is held against movement in one direction relative to the sleeve by the lock nuts 39. The sleeve 38 is connected in known fashion to the drive spindle 35. A coil spring 40, which is interposed between the rear end of the spindle 35 and a flanged sleeve 41 operates to urge the draw-bar constantly rearwardly in the spindle 35 to hold the pinion P in chucked position. The sleeve 38 threads into the sleeve 41. The sleeve 41 is keyed to the spindle 35.

Surrounding the sleeves 38 and 41 is a piston 44 which is mounted to slide in a cylinder 45 that is bolted to the drive head 21. A coil spring 46, which is interposed between the flange 47 of cylinder 45 and a thrust bearing 48 and which surrounds spring 40, serves to urge the piston 42 rearwardly in the cylinder 45. Fluid under pressure may be admitted to the rear of the piston 44 to move the draw-bar 37 forwardly to release the pinion.

This chucking mechanism forms no part of the invention and is conventional; and any suitable type of chucking mechanism may be employed in its place. A similar chucking mechanism may be used to secure the gear to the driven spindle of the machine.

The drive spindle is adapted to be rotated during operation of the machine from a motor 50 which is mounted in the base of the machine. This motor drives the spindle through a pulley 51, which is secured to the armature shaft of the motor, the belts 52, and the pulley 53, which is keyed to the drive spindle 35.

A coil spring 55 (Fig. 2) operates normally to urge the cradle 30 in a counterclockwise direction about the pin 31 as viewed from the front of the drive head. The spring 55 serves, therefore, to bias the cradle constantly toward a position where pinion P and gear G will mesh without backlash. The spring is housed in a hole 58 drilled in the cradle. It seats at one end against the boss 56 formed on the head 21 and at its opposite end against the plug 57 that is threaded into the hole 58. The tension of the spring can be adjusted by adjusting the plug 57. An adjustable stop 60, which threads into the cradle and which is secured in position by the lock nut 61, serves to limit movement of the cradle in one direction. This stop is adapted to engage against the abutment surface 62 formed on the head 21.

Figure 6:
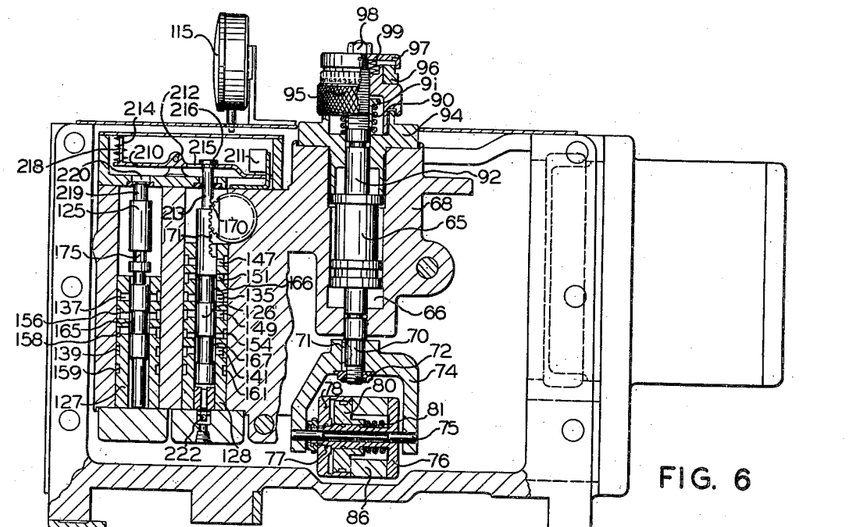
Fig. 6 is a vertical sectional view taken longitudinally of the pinion or drive head.
Figures 7, 8:
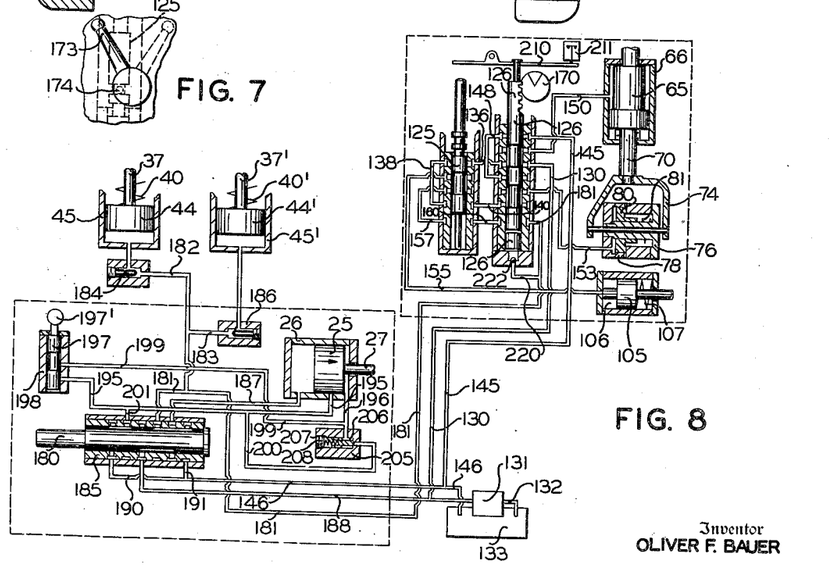
Fig. 7 is a fragmentary detail view showing the operative connection between one of the control valves of the machine and its shift lever.
Fig. 8 is a diagrammatic view illustrating the operative connections between and operation of the various fluid-pressure operated parts of the machine.

The cradle is adapted to be rocked clockwise, to control the amount of backlash between the meshing gear G and pinion P, by downward movement of a piston 65 (Figs. 6 and 8). This piston is slidable in a cylinder 66 that is formed in a casting 68 which is secured to one side of the head 21. The piston 65 has a rod 70 formed integral with it at its lower end which is connected by a key 71 and by a nut 72 to a yoke member 74. The nut 72 threads onto the lower end of the piston rod 70.

There is a pin 75 secured in the furcations of the yoke member 74. Mounted upon the pin is a plate 76 which is formed with a central hub 77. Fastened to the hub portion 77 of plate 76 is a cup-shaped member 78. A piston 80 is mounted to slide upon the hub 77 within the cup-shaped member 78. This piston is normally pressed in one direction by a coil spring 81 which surrounds the hub 77 and which is interposed between the piston and the plate 76.

Figure 3:
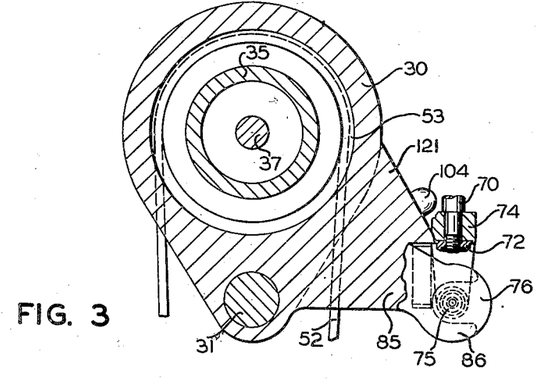
Fig. 3 is a fragmentary vertical sectional view through this head taken in a plane parallel to the plane of Fig. 2.
Figure 4:
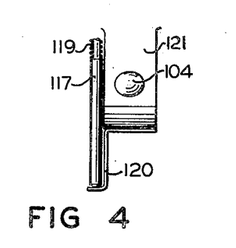
Fig. 4 is a fragmentary detail view showing the operative connection between the oscillatory carrier for the drive spindle and the plunger of the gauge which measures the amount of backlash.

The cradle 30 is formed with a laterally projecting arm 85 that terminates in a forked portion 86 (Figs. 3 and 6). The fork 86 straddles the spring 81 and hub 77 between the plate 76 and the piston 80. The coil spring 81 normally holds the piston 80 in released position. When fluid pressure is applied, however, to the left-hand end of the piston 80 (Fig. 6) the piston is moved to the right to clamp the forked portion 86 of the arm 85 between the piston and the plate 76 so that the cradle 30 will move upon movement of the piston 65.

The piston 65 is normally pressed upwardly by a coil spring 90 which engages the flange of a flanged nut 91. This nut is threaded onto the rod 92 which extends from the upper end of the piston 65 and is integral therewith. The spring 90 is interposed between the flange of the nut 91 and a seat formed on the end plate 94. This end plate is secured to casting 68 and closes the upper end of the cylinder 66. It also forms a guide for the piston rod 92.

When the cradle is clamped to yoke member 74 by piston 80 the vertical position of the piston 65 in cylinder 66 determines the pivotal position of the cradle 30, that is, the amount of backlash between pinion P and gear G. The amount of downward movement of the piston 65, then, under fluid-pressure predetermines the amount of backlash with which gear and pinion are run together. The stroke of piston 65 can be adjusted by rotation of a knurled nut 95 which threads onto the piston rod 92 above nut 91. There is a graduated ring 96 secured on the nut 95. Its graduations read against a zero mark provided on a cap 97 which is secured by the nut 98 against a shoulder of the piston rod 92.

Through the graduations of ring 96 it is possible to adjust the vertical position of piston 65 very precisely. Thus, the amount of clockwise swing of cradle 30 about pivot pin 31 under actuation of piston 65 can be predetermined very precisely to predetermine the amount of withdrawal of the cradle 30. A coil spring 99, which is interposed between cap 97 and nut 95, serves to retain the cap 97 in position when the knurled nut 95 is rotated.

The cradle 30 is normally locked in central position with the axis of the drive spindle 35 vertically above the axis of pin 31. This is the position it occupies when a testing or lapping operation on a pair of gears is completed and the head is withdrawn to loading position. It is also the position which it occupies when the machine is being manually operated as will hereinafter be described. Locking is effected by a pivotal locking member 100 (Fig. 2) which is pivoted upon a pin 102 in the head 21. This locking member has a V-shaped recess 103 in one face which is adapted to engage the head of a ball-headed pin 104 that is secured in any suitable manner in the cradle 30 above and forwardly of the arm 85.

The locking member 100 is held in locking position by fluid-pressure upon the outer end of a piston 105. This piston is adapted to reciprocate in a cylinder 106 formed in the casting 68. It is formed at its inner end with a rod portion 109 that engages the back of lock lever 100 above pivot 102. A coil spring 107, that engages the tail of the lock member 100, serves to constantly press the lock member toward disengaged position. This spring is housed in a hole in the casting 68 and its tension may be adjusted by rotational adjustment of the nut 108 which threads into the head and closes the outer end of the hole.

The pivotal position of the cradle 30 is indicated at all times by a dial gauge 115 (Figs. 2 and 6) whose finger or plunger 116 engages against the upper end of a rod 117. This rod is reciprocal in a guide 118 which is secured to the casting 68; and it is constantly urged downwardly by a coil spring 119. The lower end of this rod engages an angle plate 120 which is secured in any suitable manner to the lug 121 of cradle 30 in which ball head 104 is mounted.

The movements of pistons 65 and 80 and 105 are controlled by two valves 125 and 126 (Figs. 6 and 8). The valve 125 is adapted to reciprocate in a sleeve 127 which is mounted in a suitable bored hole in the casting 68. The valve 126 is adapted to reciprocate in a sleeve 128 which is mounted in a parallel bored hole in the head 21. Both valves 125 and 126 are two-position valves. When they are in their lower positions shown in the drawings, they automatically insure running of the pair of gears, which are to be tested or lapped, with the predetermined amount of backlash. When the two valves are shifted to their other extreme positions, the machine can be operated as are conventional testing and lapping machines, namely, with the backlash set manually by the operator for each pair of gears that are to be tested or lapped.

The hydraulic motive fluid, which effects operation of the various fluid-pressure operated parts, is supplied to the valve 126 through a line 130 from the pump 131. This pump is connected by line 132 with the sump 133 of the machine. The motive fluid flows into the chamber of valve 126 from the line 130 through ports 135 in sleeve 128. These ports also communicate with a duct 136 which communicates with ports 137 in sleeve 127. A duct 138 connects these latter ports with a peripheral groove 139 in sleeve 127. A duct 140 connects this groove with a peripheral groove 141 in sleeve 128. Thus the pressure-fluid is supplied to valve 126 through ports 135 and 141 of sleeve 128 and may be supplied to valve 125 in one position of this last-named valve through ports 137 in sleeve 127.

The motive fluid may be exhausted from the chamber of valve 126 either through the ports 147 or the ports 149 of sleeve 128. The ports 147 are connected by ducts 145 and 146 with the sump 133 of the machine. The ports 149 are connected by a duct 148 with ports 147.

The valve 126 is connected with cylinder 66 by a duct 150 which communicates with ports 151 in sleeve 128. The valve 126 is connected with cylinder 78 by a duct 153 which communicates with ports 154 in sleeve 128. The valve 125 is connected with cylinder 106 by a duct 155 which communicates with ports 156 in sleeve 127. A duct 157 connects ports 158 of sleeve 127 with a peripheral groove 159 formed in sleeve 127. The peripheral groove 159 is connected by a duct 160 with a peripheral groove 161 formed in sleeve 128. This last-named groove is connected, as will hereinafter be described more particularly, by a duct 181 with a manually operable rotary control valve 180.

The valve 125 is provided with a peripheral groove 165 which serves to connect different ports of the sleeve 127 in different positions of the valve. The valve 126 is provided with two spaced peripheral grooves 166 and 167 which serve to connect different ports of the sleeve 128 in various positions of the valve.

The valve 126 may be shifted axially manually by rotation of a pinion 170 which engages rack teeth 171 formed on the valve stem. The pinion 170 is adapted to be operated by a hand lever 172 (Fig. 2). The valve 125 is adapted to be shifted axially by a hand lever 173 (Fig. 7). This lever carries a pin 174 which engages in the peripheral groove 175 (Fig. 6) formed in the valve stem. The two levers 172 and 173 are journaled in the casting 68.

The positions of the valves 125 and 126 determine whether the machine will operate in conventional fashion or with automatic control of backlash according to the present invention, but the various steps of chucking or dechucking gear and pinion, and of moving the drive head to or from operative position are controlled by a manually-operable rotatable valve 180. This valve 180 also causes the return of valve 126 to its upper position when the valve 180 is returned to withdraw the drive head to inoperative position. The valve 180 is similar in operation and construction to the valve 150 of the Bullock et al. Patent No. 1,881,999. It is connected with peripheral groove 161 in sleeve 128 by a duct 181. This same duct is connected by a duct 182 with one end of the cylinder 45. The piston 44, that may be operated to release the chucking mechanism for the drive spindle 35, reciprocates in the cylinder 45. The duct 182 is also connected by the duct 183 with the cylinder 45' which houses the piston 44' that is operable to release the chucking mechanism of the driven spindle. Adjustable throttle valves 184 and 186 may be interposed in the lines 182 and 183, respectively, to control the rate of flow of the motive fluid to the cylinders 45 and 45'. Pistons 44 and 44' are connected to the draw-bars 37 and 37', respectively, of the two chucking mechanisms, and are normally urged to rearward, chucking positions in cylinders 45 and 45' by coil springs 40 and 40' respectively.

The pressure-fluid is supplied to the valve 180 from the pump 131 through the duct 188. The motive fluid is exhausted from the valve 180 through the duct 190 or the duct 191. Both these ducts communicate with the duct 146 that leads back to the sump.

The valve 180 is connected by a duct 187 with one end of the cylinder 26 which houses the piston 25 that controls the in and out movement of drive head 21. Two other ducts connect with the cylinder 26. These are denoted at 195 and 196, respectively. The duct 195 communicates directly with a jogger valve 197 that is reciprocal in a cylinder 198. The other duct communicates through a duct 199 with this same jogger valve. The duct 195 also communicates with ducts 200 and 201. Duct 200 leads to a check valve 206 that is mounted in the housing 205. The check valve is normally held closed by a spring 207 whose tension can be adjusted by a nut 208. The duct 196 leads into the chamber of the check valve. The duct 201 communicates with valve 180.

When the manually operable valve 180 is rotated in the forward direction the pressure line 188 is connected with the line 187 through the valve 180. This causes the piston 25 to be moved forwardly in its cylinder 26 advancing the pinion head 21 toward the gear head 22. At the same time the motive fluid exhausts from the cylinder 26 through the lines 195, 201, 190, and 146 to the sump 133. When the head 21 has moved in almost to operative position, the piston 25 shuts off the line 195. Thereafter, the motive fluid can only exhaust from the right-hand end of cylinder 26 through ducts 196 and 199, and jogger valve 197. Communication between the lines 196 and 200 is at this time shut off by check valve 206. This permits the operator to align the tooth spaces of the gear G with the teeth of the pinion P and then to jog the drive head 21 in the remaining part of its travel by pushing down on the knob 197' of the jogger valve 197. This valve is constructed and operates in the same way as the valve 192 of the Bullock et al. Patent No. 1,881,999. When the jogger valve is depressed, the motive fluid exhausts from the right-hand end of cylinder 26 through the lines 196, 199, 195, 201, 190, and 146 to the sump. Thus, the pinion head 21 may be inched in to operative position to engage the pinion P with the gear G. The chuck cylinders 45 and 45' are put on exhaust through the ducts 182, 183, 181, 191, and 146 during rotation of valve 180; and thus gear and pinion are chucked.

Figure 5:
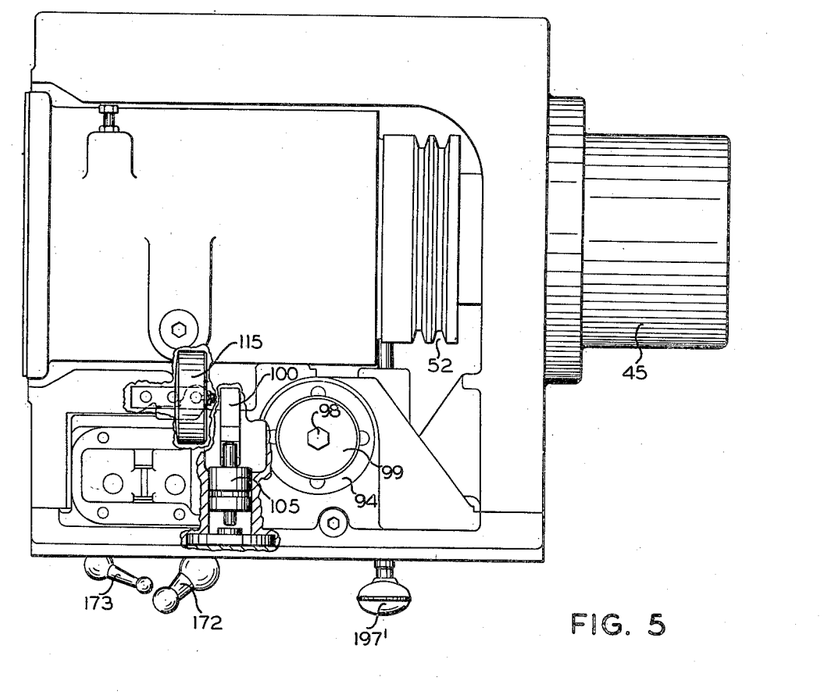
Fig. 5 is a plan view, with parts broken away, of the pinion or drive head of the machine.

While the valve 180 is being rotated in the forward direction, the lock cylinder 106 is put on exhaust through duct 155, ports 156 and 158, and ducts 157, 160, 181, 191, and 146. This latter causes spring 107 (Fig. 2) to rock lock lever 100 out of the way and releases cradle 30. As the pinion head 21 is moved into operative position, then, the pinion P can mesh at full depth without backlash with the gear G and be held in this position under pressure of the spring 55 (Fig. 2). Then the operator moves the valve 126 down by movement of handle 172 (Figs. 2 and 5). The downward movement of the valve is resisted by operation of check valve 222, for the hydraulic fluid must exhaust from the bottom of the valve chamber through lines 220, 181, 191, and 146 to permit descent of the valve 126. As the valve descends, the ports 141 and 154 of sleeve 128 are connected so that the pressure-fluid may flow from line 130 through ports 135 in sleeve 128, duct 136, ports 137 in sleeve 127, duct 138, peripheral groove 139 in sleeve 127, duct 140, ports 141 and 154 and in sleeve 128, and line 153 to the piston 80. This causes the fork 86 of cradle arm 85 to be clamped between the piston 80 and plate 76. In the further descent of valve 126, ports 135 and 151 of sleeve 128 are connected so that the constant pressure line 130 is connected through these ports and line 150 with the upper face of piston 65. The cylinder 166 now being on exhaust and the cradle 30 therefore being released, the pressure-fluid acting on the upper face of piston 65, rocks the cradle 30, which is now clamped by the yoke 74, clockwise to move the pinion P away from the gear G the distance necessary to provide the required backlash between the sides of the teeth of the gear and the pinion. The amount of this movement has been predetermined by the adjustment of piston 65 by knurled nut 95; and it is automatic and constant for any given adjustment of the piston. Thus all gears of a given design may be tested or lapped with uniform backlash. The sequence of operations of clamping fork 86 and of rocking the cradle 30 clockwise result from the proportioning of the distance between the ports 141 and 154 to the distance between the ports 135 and 151. Ports 141 and 154 are connected by grooves 167 before ports 135 and 151 are connected by groove 166.

The gear G and pinion P, having thus been moved to the desired backlash position, are rotated together for the required time in this position under the conventional controls of the machine. The pair may be rotated in one direction only, or, if desired, first in one direction and then in the other. If the pair are being lapped, they are moved relative to one another during rotation by the conventional mechanism. After rotation for a predetermined time in one direction, they are reversed and rotated in the reverse direction for a predetermined length of time while the conventional lapping motions are being effected by the conventional lapping mechanism of the machine. Then the machine stops automatically by operation of the conventional stop mechanism.

The control valve 180 is then rotated back to connect the pressure line 188 with the line 181. This puts pressure in the duct 220 to open ball check valve 222 and shift valve 126 upwardly to its "off" position. Simultaneously the pressure-fluid enters the cylinders 45 and 45' through the lines 182 and 183, respectively, to de-chuck the pinion and gear.

When valve 126 reaches its upper position, lines 150 and 153 from cylinders 66 and 78, respectively, are put on exhaust. The line 150 exhausts through ports 151 and 147 of sleeve 128 into duct 145 while the line 153 exhausts through ports 154 and 149 of that sleeve and duct 148 into duct 145 which returns through duct 146 to the sump 133. At the same time, also, the pressure-fluid flowing from the line 181 through the groove 161 in sleeve 128, duct 160, groove 159 in sleeve 127, duct 157, and ports 158 and 156 of sleeve 127 enters line 155 to cause the piston 105 to move locking lever 100 (Fig. 2) back into locking position against the resistance of spring 107. Thereby the spindle housing or cradle 30 is returned to center position. Thus, when the cradle has returned to center position it is locked in that position. At the same time, also, line 188 is connected through valve 180 with line 201. The pressure-fluid then flows through the duct 200, through the now-opened check valve 205 and line 196 into the right-hand end of cylinder 26 to move the drive head toward withdrawn position. When the piston 25 has moved far enough to the left, the pressure-fluid also flows through line 195 into the cylinder 26 from this line, accelerating the withdrawal movement of the drive head. When the drive head is fully withdrawn, the pinion P and gear G can be removed from their respective spindles, and a new pair placed thereon. If the new pair is of the same design as the pair previously tested, the operator can return the head 21 to operative position, and then push the valve 126 down. This causes the new pair of gears to mesh with the same amount of backlash as the pair previously tested. So long as gears of the same design are being tested and the piston 65 remains in a given adjusted position, the same controlled amount of backlash will be achieved automatically for all gear pairs being tested or lapped upon downward movement of valve 126. When it is desired to test or lap gears of a different design, a different amount of backlash can be obtained by adjustment of piston 65.

While the improved machine is built for automatic backlash control, it can nevertheless, when desired, be operated in conventional manner, that is, with the operator first moving the pinion into mesh with the gear without any backlash between them, and then withdrawing the drive head sufficiently to obtain the desired amount of backlash. For this manual operation of the machine, the valve 125 is set to manual position, that is, moved by lever 173 (Fig. 7) to its upper position, and the valve 126 is set to its off position, that is, to its upper position. The shifting of these valves causes the pressure line 130 to be closed by the valve 126, but the pressure-fluid flowing from the line 181 through the groove 161, duct 160, groove 158, duct 157, ports 154 and 156, and duct 155 operates to move piston 105 in its cylinder to rock lock lever 100 (Fig. 2) against the resistance of spring 107 to lock the spindle housing or cradle 30 against movement. The machine then operates just like a conventional machine. When the valve 180 is rotated in the forward direction, the drive head 21 is moved close to operative position, and then, after the teeth of the pinion have been aligned with the tooth spaces of the gear, the head can be inched on into full depth position by depressing jogger valve 197; and during this movement gear and pinion are chucked. Then by rotating the proper hand-wheel, the drive head can be withdrawn sufficiently to provide the desired amount of backlash between gear and pinion. Then gear and pinion can be run together in the conventional manner for lapping or testing. After testing or lapping is completed, valve 180 is reversed, causing drive head 21 to be withdrawn to loading position and the gear and pinion to be dechucked.

The screw shaft 32 (Fig. 2) which adjusts the drive head on manual rotation of the proper hand wheel may be connected with the drive head and with piston 25 in the same way as screw shaft 370 and piston 375 of Fig. 12 of Condon Patent No. 2,111,170, granted March 15, 1938, are connected. In fact, the present improvement may be applied to the Condon machine.

As a safety feature, a limit switch 211 (Fig. 6) is provided that is wired into the starting circuit of the motor 50. This prevents operation of the motor 50 unless both valves 125 and 126 are in the down positions shown in Figs. 6 and 8 as required for automatic backlash control, or are both in their upper positions as required when the backlash settings are to be made manually, or unless valve 125 is up and valve 126 is down.

The switch 211 is a normally closed switch. It may be opened by counterclockwise movement of a lever 210 which is pivoted at 212 on casting 68. A spring 214, which surrounds the tail 218 of lever 210, serves constantly to urge the lever in the counterclockwise direction. The valve 126 has, however, a stem 213 at its upper end which passes through a slot 215 in the lever 210; and this stem 213 terminates in an enlarged head 216. When the valve 126 is down, then, the switch 211 is free to close. The valve 125 is also formed at its upper end with a stem portion 219, which is adapted to pass through a hole 220, to rock lever 210 clockwise against the action of spring 214, when the valve 125 is shifted to its uppermost position. Hence, when the valves 125 and 126 are up, the switch 211 is also free to close.

In the position shown in Fig. 6, the lever 210 is pulled clockwise about its pivot 212 by head 216 of the stem 213 of valve 126. Thereby, the switch 211 is permitted to close so as to close the circuit to the motor 50 through the switch 211. When the valve levers 172 and 173 (Fig. 2) are operated to shift the valves 126 and 125 upwardly, the switch also is free to close as stated. Thus, the machine can be operated when both valves are in either their positions of automatic backlash or manual backlash control. It is only when valve 126 is up and valve 125 is down, that spring 214 is free to rock lever 210 about its pivot 212 to open switch 211 and prevent operation of the machine. Thus, the machine cannot be operated until both valves 125 and 126 are correctly positioned.

Figure 9:
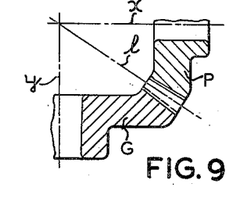
Fig. 9 is a fragmentary diagrammatic axial sectional view showing a bevel gear and pinion in a position in which they mesh with a suitable amount of backlash.
Figure 10:
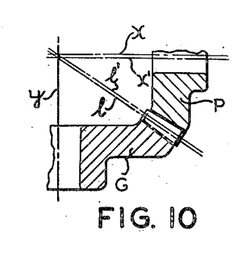
Fig. 10 is a corresponding view showing the relative positions of this same pinion and gear when meshed without backlash.

Figs. 9 and 10 illustrate diagrammatically by comparison the shift in relative positions of gear and pinion achieved through use of the automatic backlash control mechanism of the present invention. Fig. 10 shows pinion P and gear G in mesh without backlash. In this position, the pitch lines of pinion and gear are at $l$ and $l'$, respectively. $y$ designates the axis of the gear; and $x'$ denotes the position of the pinion axis. Fig. 9 shows the position assumed by pinion P after it has been shifted by the automatic backlash control mechanism. The axis of the pinion has moved from the position $x'$ to position $x$ and the pitch lines of the gear and pinion now coincide in line $l$. The pinion and gear in other words are opened up so that there is the desired amount of backlash between their interengaging teeth and tooth spaces.

Figure 11:
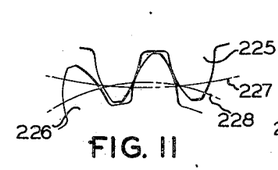
Fig. 11 is a diagrammatic end view showing a pair of gears in mesh without backlash.
Figure 12:
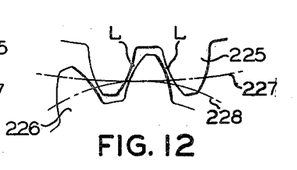
Fig. 12 is a corresponding diagrammatic view showing this same pair of gears, as separated by action of the present machine to provide the desired amount of backlash.

One of the features of the invention is that regardless of the thickness of the teeth of a particular gear and pinion the same amount of backlash can be obtained automatically between them as between any other pair of the same design. Figs. 11 and 12 show a pair of gears 225 and 226, whose teeth are of normal thickness. When these gears are engaged without backlash, they will mesh at greater than standard depth; and their pitch lines will assume the positions shown at 227 and 228, respectively, over-lapping. But when the pinion 225 is withdrawn automatically by the mechanism of this machine, it will be withdrawn depthwise from the position of Fig. 11 a predetermined distance so that the gears will run with the required backlash. Such a position is shown in Fig. 12. The desired backlash L has been attained.

Figure 13:
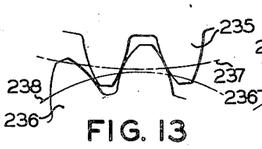
Fig. 13 is a diagrammatic view showing how a pair of gears, which have teeth of somewhat oversize thickness, will mesh when engaged without backlash.
Figure 14:
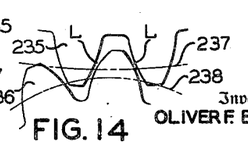
Fig. 14 is a view showing this pair of gears withdrawn from one another, by action of the machine of this invention, to a position where they have the same amount of backlash as the gears of Fig. 12.

On the other hand, if the teeth of one member are oversize, the desired backlash will still be obtained automatically. Fig. 13 shows two gears 235 and 236 which have the same pressure angle as gears 225 and 226. The gear 236 has teeth, however, that are too thick. When the gears 235 and 236 are meshed without backlash then their theoretical pitch circles will be at 237 and 238 and will not contact. With the backlash control mechanism of the present invention, however, the pinion 235 will be withdrawn automatically the same distance from the gear 236 as the pinion 225 was withdrawn from the gear 226 providing the adjustment of piston 65 (Figs. 6 and 8) remains the same. Thus, the same amount of backlash L may be obtained between gear 236 and pinion 235 as between gears 225 and 226. With the present invention, then, all gears of a given ratio and pressure angle can be tested or lapped with constant backlash.

While the machine has been described for use in the testing or lapping of gears where the gears are run together with a desired amount of backlash, it is also capable of use for testing the "runout" or eccentricity of a pair of gears where the gears are run together without backlash. In this case, the head 21 is adjusted on the base 20 until the gears are in mesh without backlash; and the cradle or housing 30 is released. The test is made with valve 125 in down position and with valve 126 in its upper position (Fig. 6), and the gears will remain in the no-backlash position. The gears may then be rotated together by hand. The operator, by watching gauge 115, can see how much the pinion moves in and out as it revolves around the gear, and can thus determine the eccentricity or "run-out" of the pair.

While the invention has been described in connection with the lapping and testing of spiral bevel gears, it will be understood that it is applicable also in the lapping or testing of straight bevel gears, hypoid gears, spur, helical and various other types of gears. Moreover, it will be understood that while the invention has been described in connection with a particular embodiment thereof, it will be understood that it is capable of further modification; and this application is intended to cover any variations, uses, or adaptations of the invention, following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. In a machine of the character described, a base, a drive head and a driven head mounted on the base, a housing movably mounted on one of said heads, a spindle journaled in said housing, a spindle journaled in the other head, means for detachably securing a gear to each spindle, means for moving one of the heads on the base toward and from the other head to move the gear carried thereby from loading position into mesh with the other gear and vice versa, means for normally locking said housing against movement relative to its head, means for releasing said locking means and for moving said housing independently of its head to control the amount of backlash between the gears when in mesh, and means for rotating the spindles to rotate the gears in mesh.

2. In a machine of the character described, a base, a drive head and a driven head mounted on the base, a housing movably mounted on one of said heads, a spindle journaled in said housing, a spindle journaled in the other head, means for detachably securing a gear to each spindle, means for normally locking said housing against movement relative to its head, means for moving one of the heads on the base to move the gear carried thereby from loading position into mesh with the other gear, means operable automatically on movement of said head to release said locking means, means for moving said housing independently of its head to cause said gears to mesh with a predetermined amount of backlash, and means for rotating one of the spindles to rotate the gears in mesh.

3. In a machine of the character described, a base, a drive head and a driven head mounted on the base, a housing movably mounted on one of said heads, a spindle journaled in said housing, a second spindle journaled in the other head, means for detachably securing a gear to each spindle, control means which is shiftable to predetermine whether the housing shall be moved relative to its head or not, means for moving one of the heads on the base toward and from the other head to move the gears relative to one another from loading position into mesh and vice versa, means operable, when the control means is in position to allow movement of the housing relative to its head, to move the housing to cause the gears to mesh with a predetermined amount of backlash, and means for rotating one of the spindles to rotate the gears in mesh.

4. In a machine of the character described, a pair of spindles, means for detachably securing a gear to each spindle, a movable housing in which one of said spindles is journaled, means operable to urge said housing in one direction to urge the gear carried by the spindle, which is journaled in said housing, to mesh without backlash with the gear carried by the other spindle, fluid-pressure operated means for moving said housing in the opposite direction to provide backlash between the gears when in mesh, said last-named means being adjustable to control the amount of said backlash, and means for rotating one of the spindles to rotate the gears in mesh.

5. In a machine of the character described, a base, a drive head and a driven head mounted on the base, a housing movably mounted on one of said heads, a spindle journaled in said housing, a spindle journaled in the other head, means for detachably securing a gear to each spindle, means for moving one of the heads on the base toward and from the other head to move the gear carried thereby from loading position into mesh with the other gear and vice versa, means for urging the housing in one direction in its head to urge the gear, which is carried by the first spindle, into mesh without backlash with the gear that is carried by the other spindle, fluid-pressure operated means comprising a cylinder and a piston reciprocable therein for moving the housing in its head in the opposite direction to provide backlash between the gears when in mesh, means for adjusting the stroke of the piston to control the amount of said backlash, a manually movable valve for controlling the operation of said fluid-pressure operated means, and means for rotating one of the spindles to rotate the gears in mesh.

6. In a machine of the character described, a base, a drive head and a driven head mounted on the base, a housing movably mounted on one of said heads, a spindle journaled in said housing, a spindle journaled in the other head, chucking mechanism for detachably securing a gear to each spindle, means for moving one of the heads on the base toward the other head to move the gear carried thereby from loading position into mesh with the other gear, means operable on said movement to actuate the chucking mechanisms, means operable to move the housing to provide a predetermined amount of backlash between the gears when in mesh, and means for rotating one of the spindles to rotate the gears in mesh.

7. In a machine of the character described, a base, a drive head and a driven head mounted on the base, a housing movably mounted on one of said heads, a spindle journaled in said housing, a spindle journaled in the other head, chucking mechanism for detachably securing a gear to each spindle, means for locking the housing against movement relative to the head, means detachably connectable to the housing for moving the housing relative to the head, when released, means for coupling said last-named means to the housing, means for moving one of the heads on the base toward the other head to move the gear carried thereby from loading position into mesh with the other gear, means operable on said movement to actuate said chucking mechanisms, and release said locking means, means for coupling said housing to the means for moving the same and for actuating said second-named means to move said housing in a direction to provide a predetermined amount of backlash between the gears when in mesh, and means for rotating one of the spindles to rotate the gears in mesh.

8. In a machine of the character described, a base, a pair of heads mounted on the base, a housing movably mounted in one head, a spindle journaled in the other head, a second spindle journaled in said housing, means for detachably securing a gear to each spindle, means for locking the housing against movement relative to its head, means for moving one of the heads on the base to move the gears into mesh, means operable on said movement to release said locking means, means for urging the housing, when released, in one direction to cause the gear, which is carried by the second spindle to mesh without backlash with the gear that is carried by the first spindle, means operable to move the housing in the opposite direction when released, to provide backlash between said gears, means for coupling the last-named moving means to the housing, to cause the gears to be moved apart to provide a predetermined amount of backlash between them, and means for rotating one of the spindles to rotate the gears in mesh.

9. In a machine of the character described, a pair of heads, a housing movably mounted on one head, a spindle journaled in the other head, a second spindle journaled in the housing, means for detachably securing a gear to each of said spindles, said housing having a projection formed thereon, a cylinder disposed at one side of said projection and a plate disposed at the other side thereof, a piston reciprocable in said cylinder, means for applying fluid-pressure to one side of said piston to clamp said projection between the piston and the plate, a second cylinder, a piston reciprocable in said second cylinder, means secured to the second piston for carrying the first cylinder and plate, means for applying fluid-pressure to the second piston on clamping of said projection to cause the housing to be moved in its head to provide a predetermined amount of backlash between said gears, and means for rotating said spindles to rotate the gears in mesh with said backlash.

10. In a machine of the character described, a base, a pair of heads mounted on said base, a housing rockably mounted in one of said heads, a spindle journaled in said housing with its axis parallel to but offset from the axis of the housing, a second spindle journaled in the other head with its axis at an angle to the axis of the first spindle, means for detachably securing a gear to each spindle, means for moving the head, which carries said housing, on the base in a direction inclined to the axis of said housing and parallel to the axis of the second spindle to move the gear, which is carried by the first spindle, depthwise into mesh with the gear carried by the second spindle, means operable to urge the housing in one direction about its axis to move the gear, which is carried by the first spindle, into mesh without backlash with the gear which is carried by the second spindle, means for locking the housing against movement about its axis, and means operable upon release of the locking means to rock the housing in its head in the opposite direction to a predetermined position to provide a predetermined amount of backlash between said gears, and means for rotating one of the spindles to rotate the gears in mesh with said backlash.

11. In a machine of the character described, a base, a pair of heads mounted on said base, a housing pivotally mounted in one of said heads, a spindle journaled in said housing with its axis parallel to but offset from the axis of the housing, a second spindle journaled in the other head with its axis at an angle to the axis of the first spindle, means for detachably securing a gear to each spindle, means for moving the head, which carries said housing, on the base in a direction inclined to the axis of said housing to move the gears into mesh, means for locking the housing in its head with the spindle carried thereby in an on-center position, means for rocking the housing in its head, when released, to a predetermined position off-center to control the amount of backlash between the gears, and means for rotating one of the spindles to rotate the gears in mesh with said backlash.

12. In a machine of the character described, a base, a drive head and a driven head mounted on the base, a housing movably mounted on one of said heads, a spindle journaled in said housing, a second spindle journaled in the other head, means for detachably securing a gear to each spindle, means for moving one of the heads on the base toward and from the other head from loading position into gear meshing position, and vice versa, means urging the housing in one direction on the head to urge the gear, which is carried by the first spindle into mesh without backlash with the gear that is carried by the second spindle, means operable to move the housing on the head a predetermined distance in the opposite direction and to hold the housing in the position to which it is so moved, thereby to provide a predetermined amount of backlash between the gears when in mesh, and means for rotating the spindles to rotate the gears in mesh.

OLIVER F. BAUER.

REFERENCES CITED

The following references are of record in the file of this patent:

UNITED STATES PATENTS

| Number | Name | Date |
|---|---|---|
| 1,840,231 | Harrison et al. | Jan. 5, 1932 |
| 1,881,999 | Bullock et al. | Oct. 11, 1932 |
| 1,966,172 | Jackowski | July 10, 1934 |
| 2,092,721 | Arter | Sept. 7, 1937 |
| 2,326,368 | Kullman | Aug. 10, 1943 |

FOREIGN PATENTS

| Number | Country | Date |
|---|---|---|
| 342,406 | Great Britain | Feb. 5, 1931 |